US007693920B2

(12) United States Patent
Chiao

(10) Patent No.: US 7,693,920 B2
(45) Date of Patent: Apr. 6, 2010

(54) RECYCLE-FREE DIRECTORY ENTRY SYSTEM AND METHOD

(75) Inventor: Mong-Ling Chiao, Taipei (TW)

(73) Assignee: Sunplus Technology Co., Ltd, Hsinchu (TW)

( * ) Notice: Subject to any disclaimer, the term of this patent is extended or adjusted under 35 U.S.C. 154(b) by 301 days.

(21) Appl. No.: 11/653,963

(22) Filed: Jan. 17, 2007

(65) Prior Publication Data

US 2007/0185888 A1 Aug. 9, 2007

(30) Foreign Application Priority Data

Jan. 17, 2006 (TW) .............................. 95101690 A

(51) Int. Cl.
*G06F 12/00* (2006.01)
*G06F 17/30* (2006.01)

(52) U.S. Cl. ....................................... 707/828; 711/153

(58) Field of Classification Search ............... 707/1-10, 707/100-104.1, 200-206; 711/103, 153, 711/170-173, 205-212
See application file for complete search history.

(56) References Cited

U.S. PATENT DOCUMENTS 4,875,155 A * 10/1989 Iskiyan et al. ............... 711/113
5,832,526 A * 11/1998 Schuyler ..................... 707/205
5,837,423 A * 11/1998 Okamoto .................... 430/296
5,941,982 A * 8/1999 Ginosar et al. .............. 712/210

OTHER PUBLICATIONS

Hong Tang et al., A Self-Organizing Storage Cluster for Parallel Data-Intensive Applications, Nov. 2004, ACM, 13 Pages.*
Seung-Ho Lim et al., Hashing Directory Scheme for NAND Flash File System, Feb. 12-14, 2007, IEEE, 273-276.*
Sunhwa Park et al., Atomic write FTL for robust flash file system, Jun. 14-16, 2005, IEEE, 155-160.*

* cited by examiner

*Primary Examiner*—Jean B Fleurantin
(74) *Attorney, Agent, or Firm*—Bacon & Thomas, PLLC

(57) ABSTRACT

A recycle-free directory entry system and method thereof applicable in a file system are provided. The file system uses one or more directory entries to record a unique file/directory name. The recycle-free directory entry method consists of plural directory entries stored in a storage device with a plurality of sectors, each sector only recording all directory entries corresponding to a unique file/directory. Each directory entry has a directory name field, a directory attribute field and a reserve field. The directory name field records a filename of a related file/directory. The directory attribute field records an attribute of the related file/directory. The reserve field records an identity byte, which indicates that all directory entries corresponding to the related file/directory are exclusively recorded in a single sector.

15 Claims, 10 Drawing Sheets

| | Field name | Address (byte) | Size (byte) | Description |
|---|---|---|---|---|
| 501 | Directory name field | 0 | 11 | Record a filename of a file |
| 503 | Directory attribute field | 11 | 1 | Record an attribute of the file |
| 505 | Reserve field | 12 | 1 | Record an identity byte |
| 507 | File generation time subfield | 13 | 1 | Record a millisecond generation time of the file |
| 509 | File generation time field | 14 | 2 | Record a generation time of the file |
| 511 | File generation date field | 16 | 2 | Record a generation date of the file |
| 513 | Last access date field | 18 | 2 | Record the last access time of the file |
| 515 | File cluster field 1 | 20 | 2 | Record a first cluster number of a directory entry |
| 517 | File write-in time field | 22 | 2 | Record a write-in time of the file |
| 519 | File write-in date field | 24 | 2 | Record a write-in date of the file |
| 521 | File cluster field 2 | 26 | 2 | Record the first cluster number of the directory entry |
| 523 | File size field | 28 | 2 | Record a size of the file |

FIG. 6

| Offeset | 00 | 01 | 02 | 03 | 04 | 05 | 06 | 07 | 08 | 09 | 0A | 0B | 0C | 0D | 0E | 0F |
|---|---|---|---|---|---|---|---|---|---|---|---|---|---|---|---|---|
| 0010 7000 | 43 | 37 | 00 | 38 | 00 | 39 | 00 | 30 | 00 | 2E | 00 | 0F | 00 | 0A | 74 | 00 |
| 0010 7010 | 78 | 00 | 74 | 00 | 00 | 00 | FF | FF | FF | FF | 00 | 00 | FF | FF | FF | FF |
| 0010 7020 | 02 | 34 | 00 | 35 | 00 | 36 | 00 | 37 | 00 | 38 | 00 | 0F | 00 | 0A | 39 | 00 |
| 0010 7030 | 30 | 00 | 31 | 00 | 32 | 00 | 33 | 00 | 34 | 00 | 00 | 00 | 35 | 00 | 36 | 00 |
| 0010 7040 | 01 | 31 | 00 | 32 | 00 | 33 | 00 | 34 | 00 | 35 | 00 | 0F | 00 | 0A | 36 | 00 |
| 0010 7050 | 37 | 00 | 38 | 00 | 39 | 00 | 2E | 00 | 74 | 00 | 00 | 00 | 78 | 00 | 74 | 00 |
| 0010 7060 | E5 | 31 | 00 | 32 | 00 | 33 | 00 | 34 | 00 | 35 | 00 | 0F | 00 | 2A | 36 | 00 |
| 0010 7070 | 37 | 00 | 38 | 00 | 39 | 00 | 2E | 00 | 74 | 00 | 00 | 00 | 78 | 00 | 74 | 00 |
| 0010 7080 | E5 | 31 | 00 | 32 | 00 | 33 | 00 | 34 | 00 | 35 | 00 | 0F | 00 | 2A | 36 | 00 |
| 0010 7090 | 37 | 00 | 38 | 00 | 39 | 00 | 2E | 00 | 74 | 00 | 00 | 00 | 78 | 00 | 74 | 00 |

RECYCLE-FREE DIRECTORY ENTRY SYSTEM AND METHOD

BACKGROUND OF THE INVENTION

1. Field of the Invention

The invention relates to the technical field of file systems and, more particularly, to a recycle-free directory entry system and method that is used in a file system.

2. Description of Related Art

As semiconductor processes have developed rapidly, more transistors can be contained in a same area such that electronic devices have the enhanced functions and the trend of sizes is toward being light, thin and small. Accordingly, the capacity of a single packaged NAND flash memory is continuously increased, and a hand-held MP3 player with NAND flash memory can rapidly increase the capacity. In order to download MP3 songs from different platforms, the hand-held MP3 player typically implements an internal FAT32 file system.

FIG. 1 is a schematic view of directory entries of a conventional FAT32 file system that are recorded in a storage device. As shown in FIG. 1, the storage device has sectors 11, each providing a memory space to record one or more directory entries 12. As shown, a file 13 in the file system corresponds to one or more directory entries 12. The directory entries 12 record the name and associated data of the corresponding file 13. Searching, deleting and/or adding files are required for operation of the file system, and accordingly the traverse, delete and new functions are provided to the directory entries 12.

FIG. 2 is a flowchart of a traverse operation in the conventional FAT32 file system. As shown in FIG. 2, step S110 reads a sector 11 from the storage device. Step S120 filters a next target directory entry 12 from the sector 11 read, where each directory entry 12 has 32 bytes. Step S130 determines if the directory entry 12 obtained has the first byte containing "0x00". When the first byte is determined to contain "0x00", it indicates that the directory entry 12 is not used and not followed by another directory entry 12, and in this case, no traverse is operated and the procedure is ended. When the first byte is determined to not contain a value of 0x00, step 140 is executed. Step S140 further determines if the first byte contains 0xE5. When the first byte is determined to contain 0xE5, it indicates that the directory entry 12 is not used but followed by another directory entry 12, namely, the directory entry 12 corresponds to a deleted file 13, and in this case, step S120 is executed to filter a next directory entry 12. When the first byte is determined to not contain 0xE5, it indicates that the directory entry 12 is used by the file 13, and step S150 is executed to gather a filename in accordance with data read from all directory entries 12 read. Step S160 determines if the filename gathered is complete. When the filename gathered is complete, it indicates that the file 13 is traversed and the procedure is ended. When the filename gathered is not complete, step S170 is executed. Step S170 further determines if the tail of the sector 11 is read. When the tail of the sector 11 is read, step S110 is executed to read a next sector. When the tail of the sector 11 is not read, step S120 is executed to filter a next directory entry 12.

FIG. 3 is a flowchart of a delete operation in the conventional FAT32 file system. As shown in FIG. 3, step S210 reads a sector 11 from the storage device. Step S220 filters a next directory entry 12 from the sector 11 read, where each directory entry 12 has 32 bytes. Step S230 determines if the directory entry 12 obtained has the first byte containing "0x00". When the first byte is determined to contain "0x00", it indicates that the directory entry 12 is not used and not followed by another directory entry 12, and in this case, no directory entry 12 can be deleted and the procedure is ended. When the first byte is determined to not contain 0x00, step 240 is executed. Step S240 further determines if the first byte determined contains 0xE5. When the first byte is determined to contain 0xE5, it indicates that the directory entry 12 is not used but followed by another directory entry 12, and in this case, step S220 is executed to filter a next directory entry 12. When the first byte is determined to not contain 0xE5, it indicates that the directory entry 12 is used by the file 13, and step S250 is executed to concatenate data read from all directory entries 12 read to thereby form a filename. Step S260 determines if the filename is a target filename. When the filename is the target filename, step S280 is executed to set the first byte determined to contain 0xE5 to indicate the directory entry 12 is unused. When the filename is not the target filename, step S270 is executed. Step S270 further determines if the tail of the sector 11 is read. When the tail of the sector 11 is read, step S210 is executed to read a next sector. When the tail of the sector 11 is not read, step S220 is executed to filter a next directory entry 12.

FIG. 4 is a flowchart of an appending operation in the conventional FAT32 file system. As shown in FIG. 4, step S310 reads a sector 11 from the storage device. Step S320 filters a next directory entry 12 from the sector 11 read, where each directory entry 12 has 32 bytes. Step S330 determines if the directory entry 12 obtained has the first byte containing "0x00". When the first byte is determined to contain "0x00", it indicates that the directory entry 12 is not used and not followed by another directory entry 12, and in this case, step 350 adds a new directory entry 12 immediately after the directory entry 12. When the first byte is determined to not contain 0x00, step 340 is executed. Step S340 further determines if the tail of the sector 11 is read. When the tail of the sector 11 is read, step S310 is executed to read a next sector 11. When the tail of the sector 11 is not read, step S320 is executed to filter a next directory entry 12.

As cited, the conventional FAT32 file system applies one or more directory entries to record the filename and associated data of the file 13, and each directory entry uses 32 bytes. However, the required length is changed because of different filenames, which can have a filename up to 255 characters. Accordingly, a single file 13 may require one to ten directory entries 12, which causes an uncertainty of the use amount of space. When the file system is traversed, the directory entries 12 have to read one by one and determine the contents due to the uncertainty of required length, in order to obtain the complete information for determining if there exists a next directory/file 13 or not and determining where the file 13 is. Such a way takes too much time. In addition, as learned from the flowcharts of FIGS. 2 to 4, the prior art requires plural comparisons, which also make the operation of the directory entries 12 of the typical FAT32 file system waste too much time. Further, the directories/files 13 deleted may release different space lengths thus causing uncertainty, and the space cannot be reused by proceeding files 13 thus causing space waste.

Therefore, it is desirable to provide an improved directory entry system and method to mitigate and/or obviate the aforementioned problems.

SUMMARY OF THE INVENTION

The object of the invention is to provide a recycle-free directory entry system and method, which can increase the access performance of the conventional file system and reduce the space waste caused by performing add and/or delete file operations on the typical file system in the prior art.

In accordance with one aspect of the invention, there is provided a recycle-free directory entry system, which is used in a file system. The file system uses one or more directory entries to record a filename and associated data of a file. The recycle-free directory entry system consists of directory entries stored in a storage device with a plurality of sectors, each sector recording the one or more directory entries of a unique file. Each directory entry has a directory name field, a directory attribute field and a reserve field. The directory name field has a length of eleven bytes to record the filename of the file. The directory attribute field has a length of one byte to record an attribute of the file. The reserve field has a length of one byte for recording an identity byte to indicate that all directory entries corresponding to the file are exclusively recorded in a single sector.

In accordance with another aspect of the invention, there is provided a recycle-free directory entry method, which is used in a file system. The file system uses one or more directory entries to record a filename and associated data of a file, and has a storage device with a plurality of sectors, each sector recording all directory entries corresponding to a unique file. The method includes the steps: (A) reading data of a sector from the storage device; (B) filtering a directory entry from the sector; and (C) exclusively writing directory entries corresponding to the file in the sector when the directory entry filtered is free, and conversely, executing step (A).

In accordance with a further aspect of the invention, there is provided a recycle-free directory entry method, which is used in a file system having a storage device with a plurality of sectors, each sector recording one or more directory entries of a unique file, the one or more directory entries recording a filename and associated data of the file, the method comprising the steps: (A) reading data of a sector from the storage device; (B) filtering a directory entry from the data of the sector; and (C) gathering the filename from the data read when the directory entry filtered is not free, and executing step (A) when the directory entry filtered is free and followed by another directory entry.

In accordance with still a further aspect of the invention, there is provided a recycle-free directory entry method, which is used in a file system having a storage device with a plurality of sectors, each sector recording one or more directory entries of a unique file, the one or more directory entries recording a filename and associated data of the file, the method comprising the steps: (A) reading data of a sector from the storage device; (B) filtering a directory entry from the sector; (C) concatenating the filename from the data read when the directory entry filtered is not free, and executing step (D) when the directory entry filtered is free and followed by another directory entry; and (E) setting the directory entry to be free when the filename concatenated is a target file to be deleted, and conversely executing (F).

Other objects, advantages, and novel features of the invention will become more apparent from the following detailed description when taken in conjunction with the accompanying drawings.

BRIEF DESCRIPTION OF THE DRAWINGS

FIG. 6 is a schematic view of fields of each directory entry in accordance with the invention;

FIG. 10 is a schematic view of using a sector to record all directory entries corresponding to a file.

DETAILED DESCRIPTION OF THE PREFERRED EMBODIMENT

Currently, a typical random access media, such as a hard disk, NOR-type flash memory or NAND-type flash memory, uses a sector as a unit of access, and each sector contains 512 bytes. A file system uses one or more directory entries (DEs) to record a filename and associated data of a directory/file. A file cited in this embodiment is generally referred to as a directory or file, which is well-known term to a person skilled in the prior art. Namely, the invention can be used in the directories or files of a file system, and each directory entry uses 32 bytes. In this case, a sector can contain 16 directory entries. Because a file in a file allocation table (FAT) occupies 10 directory entries at most, a sector is enough to contain the directory entry or entries of a directory/file. Accordingly, in the present invention, the directory entry or entries of a directory/file are stored in a same sector to thereby reduce the time for operating directory entries of the file system and increase the performance of the file system.

Figure 1:
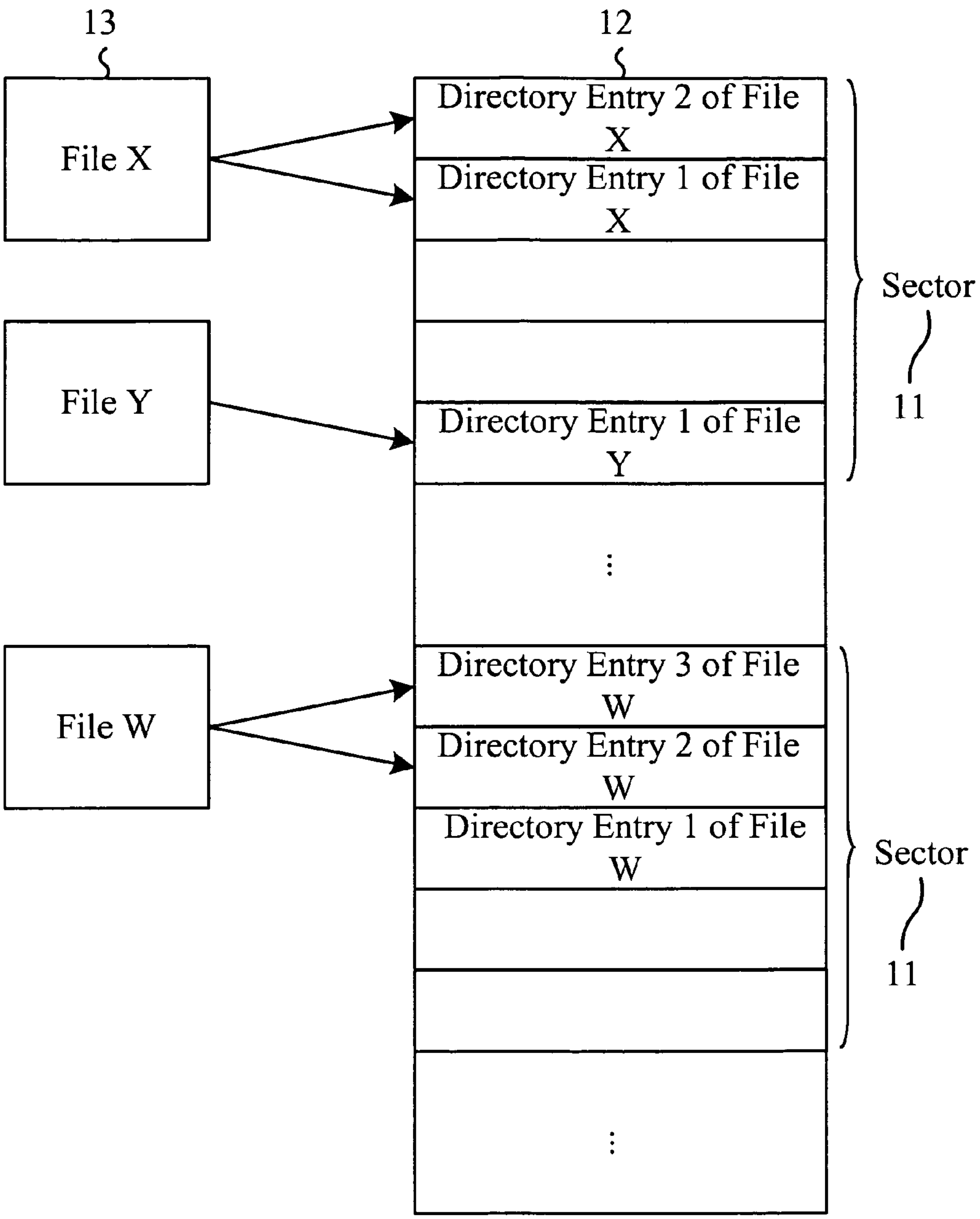
FIG. 1 is a schematic view of directory entries of a conventional FAT32 file system.
Figure 2:
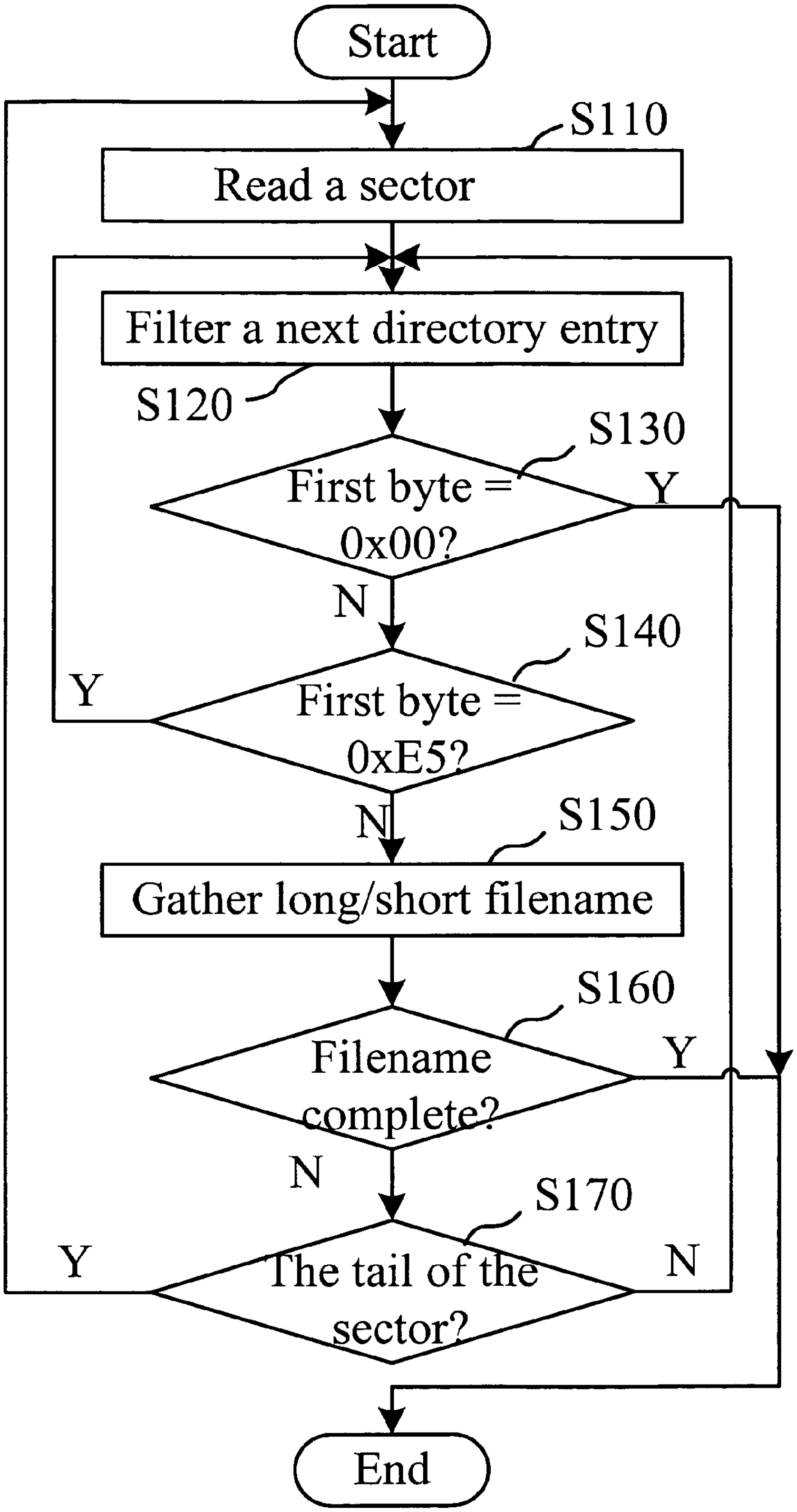
FIG. 2 is a flowchart of a traverse operation in the typical FAT32 file system.
Figure 3:
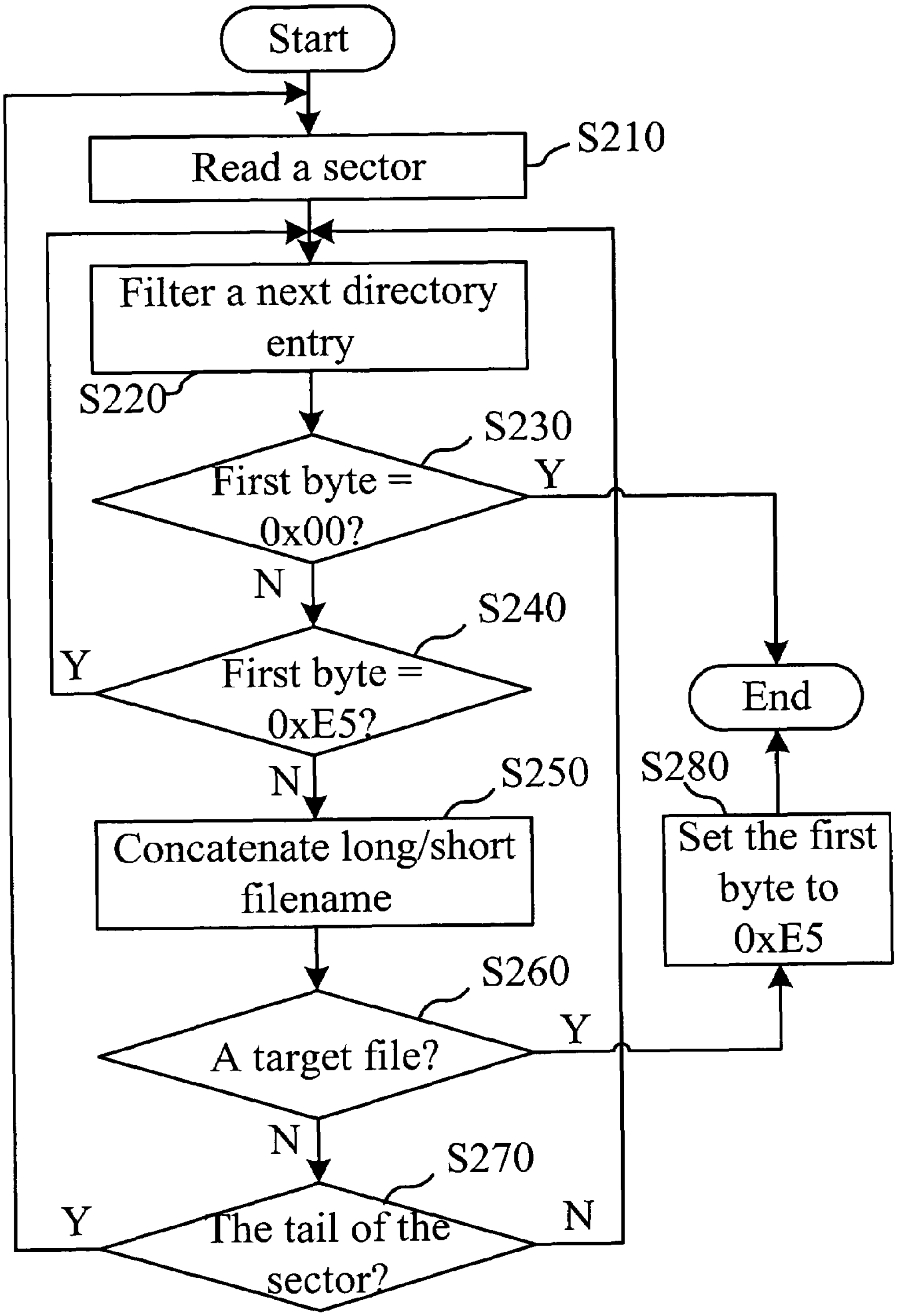
FIG. 3 is a flowchart of a delete operation in the typical FAT32 file system.
Figure 4:
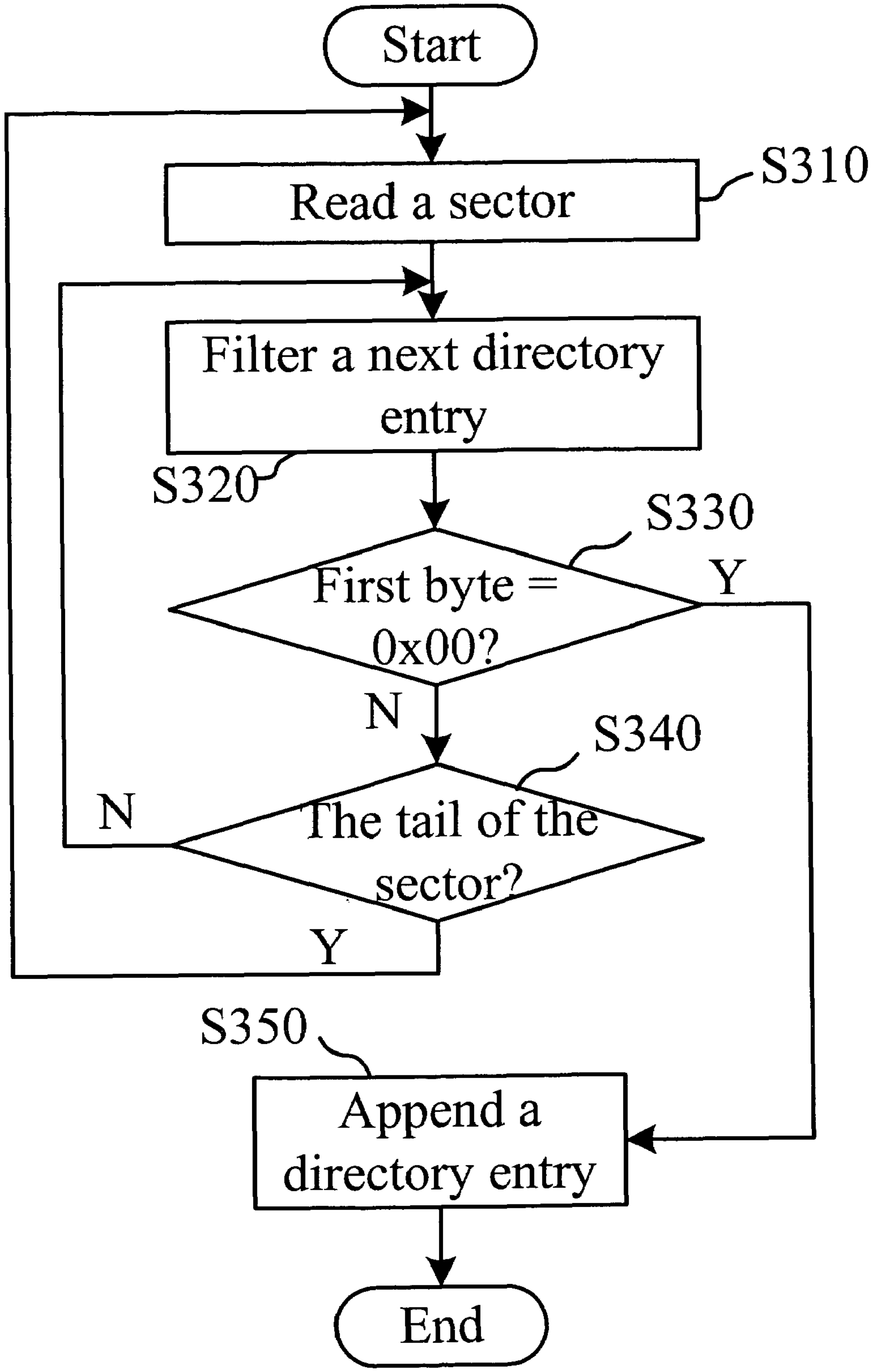
FIG. 4 is a flowchart of an appending operation in the conventional FAT32 file system.
Figure 5:
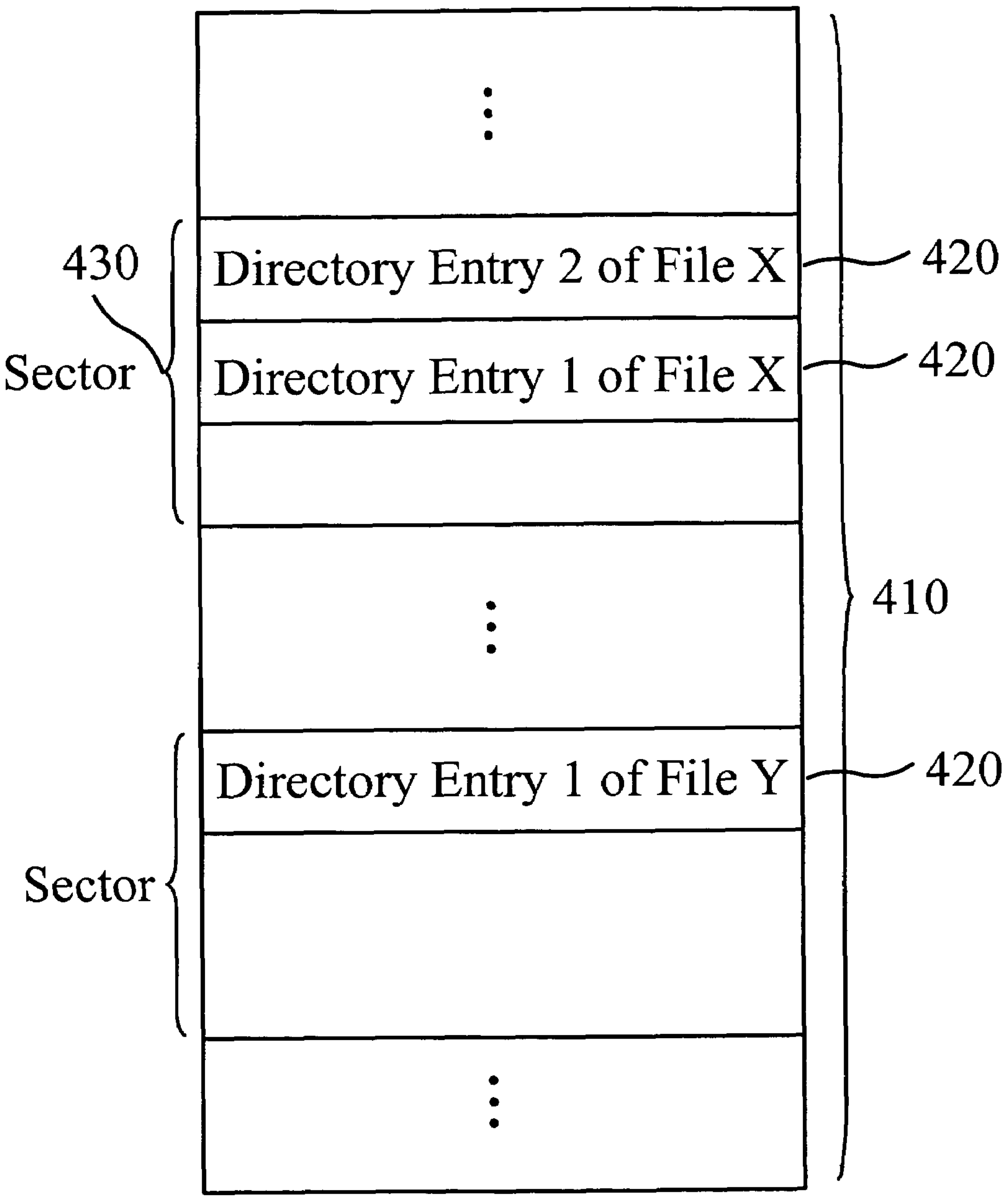
FIG. 5 is a schematic view of a recycle-free directory entry system in accordance with the invention.

FIG. 5 is a schematic view of a recycle-free directory entry system in accordance with the invention, which is used in a file system. The file system uses one or more directory entries to record a filename and associated data of a file. The recycle-free directory entry system consists of directory entries 420 stored in a storage device 410. The storage device 410 has a plurality of sectors 430, and each sector 430 is recorded with one or more directory entries 420 associated with a unique file. For example, a sector N only records two directory entries 420 associated with a file X, and a sector K only records one directory entry 420 associated with a file Y. The storage device 410 can be a NOR flash memory, NAND flash memory or hard disk.

FIG. 6 is a schematic view of fields of each directory entry 420 in accordance with the invention. The directory entry 420 has a directory name field 501, a directory attribute field 503, a reserve field 505, a file creation time subfield 507, a file creation time field 509, a file creation date field 511, a last access date field 513, a file write-in time field 517, a file write-in date field 519, two file cluster fields 515, 521, and a file size field 523.

The directory name field 501 has a length of 11 bytes to record a filename of a related file. When the first byte of the field 501 contains 0x00, it indicates that the directory entry 420 can be free and is not followed by another directory entry 12. When the first byte of the field 501 contains 0xE5, it indicates that the directory entry 420 can be free and is followed by another directory entry 12. Namely, the related file corresponding to the directory entry 420 is deleted.

The directory attribute field 503 has a length of one byte to record an attribute of the related file. When the field 503 contains 0x01, it indicates that the attribute recorded is "read-only". When the field 503 contains 0x02, it indicates that the attribute recorded is "hidden". When the field 503 contains 0x04, it indicates that the attribute recorded is "system". When the field 503 contains 0x08, it indicates that the attribute recorded is "volume id". When the field 503 contains 0x10, it indicates that the attribute recorded is "directory". When the field 503 contains 0x20, it indicates that the attribute recorded is "archive".

The reserve field 505 has a length of one byte to record an identity byte, which indicates that directory entries 420 corresponding to the related file are exclusively recorded in a single sector 430. The reserve field 505 contains a special value, such as 0xA5, which indicates that the directory entries 420 corresponding to the related file are stored in a same sector 430. Namely, the same sector 430 does not record the directory entries 420 of other files.

The file creation date field 511 has a length of two bytes to record a creation date of the related file. The file creation time field 509 has a length of two bytes to record a creation time of the related file. The file creation time subfield 507 has a length of one byte to record a millisecond creation time of the related file.

The last access date field 513 has a length of two bytes to record a last access date of the related file. The file write-in date field 519 has a length of two bytes to record a write-in date of the related file. The file write-in time field 517 has a length of two bytes to record a write-in time of the related file.

The file cluster fields 515, 521 totally have a length of four bytes to record a first cluster number of the directory entry. The file size field 523 has a length of four bytes to record a size of the related file in a unit of byte.

Because each directory entry 420 uses a 32-byte space, a sector 430 can contain 16 directory entries. In the prior art, a sector can contain the directory entries of one or more files, and in this case, an appending function is required for appending all directory entries of a file after the last directory entry of another file. However, the invention stores all directory entries of a file in a same sector 430, and in this case, the appending function is not required. Alternately, the invention uses an insert function to establish the directory entries 420 of a file. In addition, the traverse and delete functions are still provided to the directory entries 420.

Figure 7:
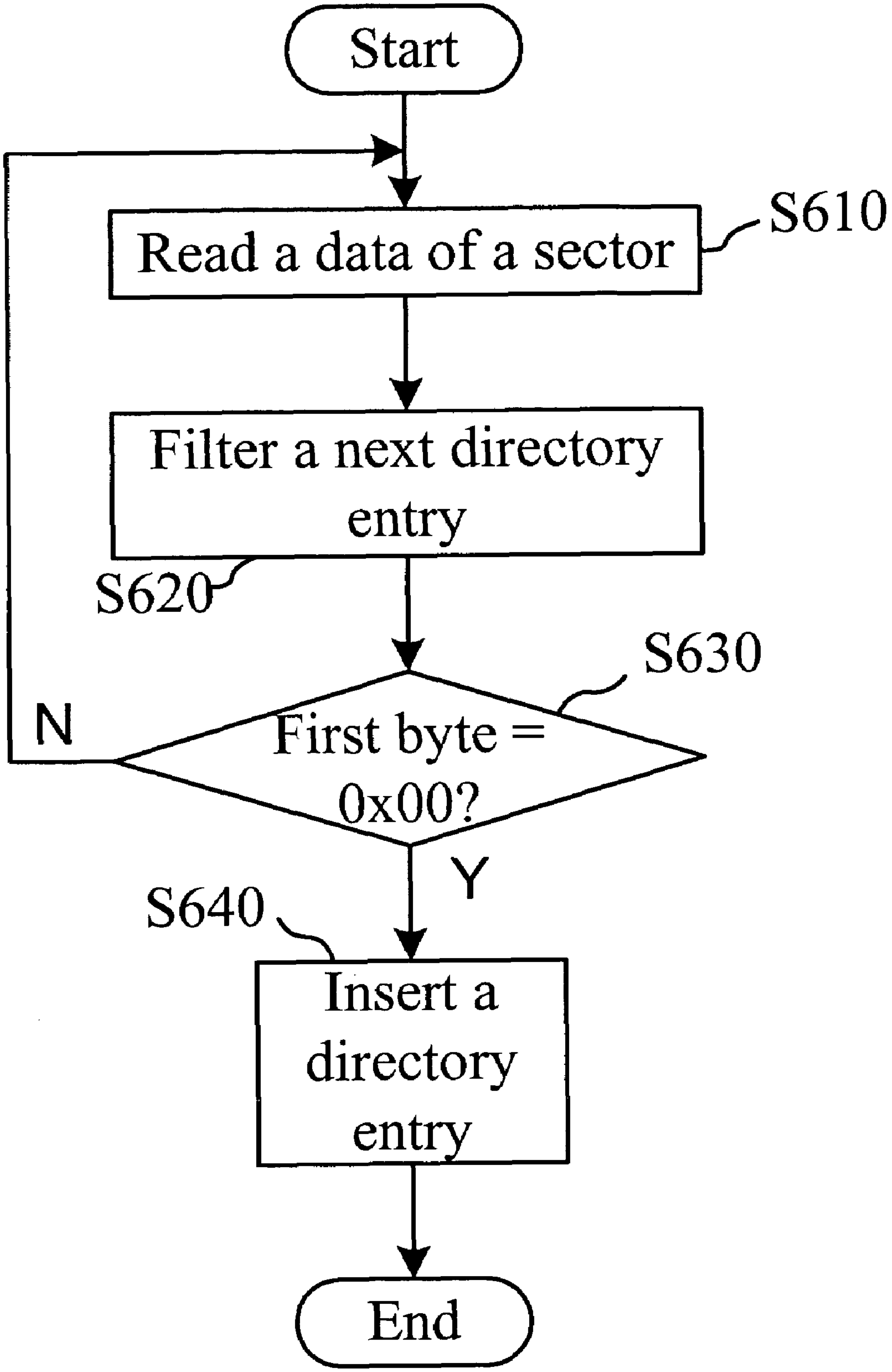
FIG. 7 is a flowchart of a recycle-free directory entry method for insertion in accordance with the invention.

The insert method is used to achieve the functionality of the new method of recycling-free directory entries. FIG. 7 is a flowchart of the insert method for the recycle-free directory entry system in accordance with the invention. As shown in FIG. 7, step S610 reads a data of a sector 430 from a storage device 410. Step S620 filters a data of a directory entry 420 from the sector 430 read, i.e., the first 32 bytes of the sector 430 are filtered. Step S630 determines if the sector 430 is free. When the sector 430 is determined to be free, the sector 430 is exclusively written in directory entries 420 of a file (step S640). When the sector 430 is determined not to be free, step S610 is executed again to read a data of a next sector 430. Step S630 determines if the first byte of the sector 430 contains 0x00. When the first byte is determined to contain 0x00, it indicates that the sector 430 is free.

Figure 8:
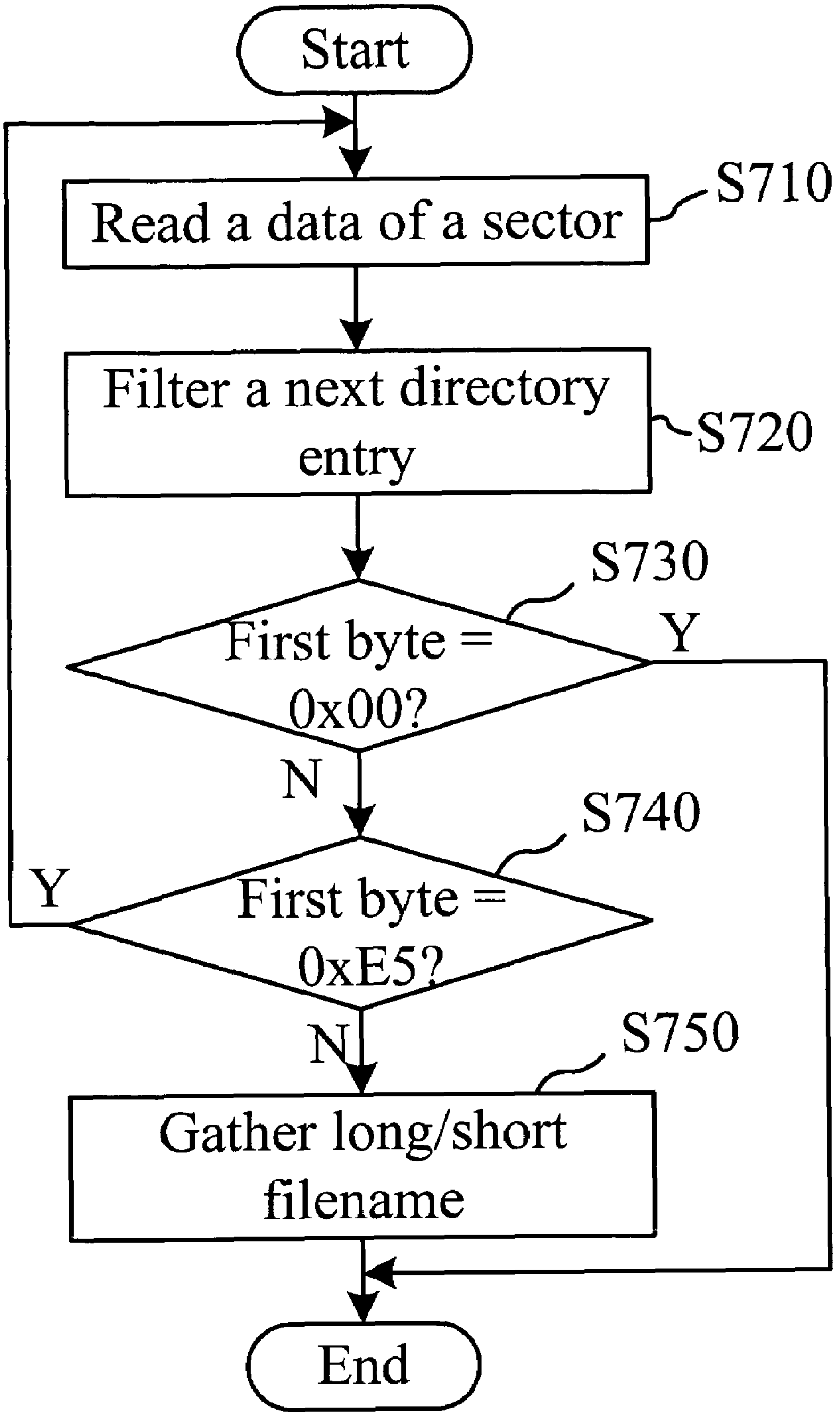
FIG. 8 is a flowchart of a recycle-free directory entry method for traverse in accordance with the invention.

FIG. 8 is a flowchart of a traverse method for the recycle-free directory entry system in accordance with the invention. As shown in FIG. 8, step S710 reads a data of a sector 430 from a storage device 410. Step S720 filters a data of a directory entry 420 from the sector 430 read, i.e., the first 32 bytes of the sector 430 are filtered. Step S730 determines if the directory entry 420 is free and not followed by another directory entry 420, namely, to see if the first byte of the directory entry 420 contains 0x00. When the first byte of the directory entry 420 contains 0x00, no traverse is operated and the procedure is ended; and conversely, step S740 is executed.

Step S740 determines if the directory entry 420 is free and followed by another directory entry 420, namely, to see if the first byte of the directory entry 420 contains 0xE0. When the first byte of the directory entry 420 contains 0xE0, step S710 is executed again to read a next sector 430; and conversely, step S750 executed. Step S750 gathers all data read to form a filename.

Figure 9:
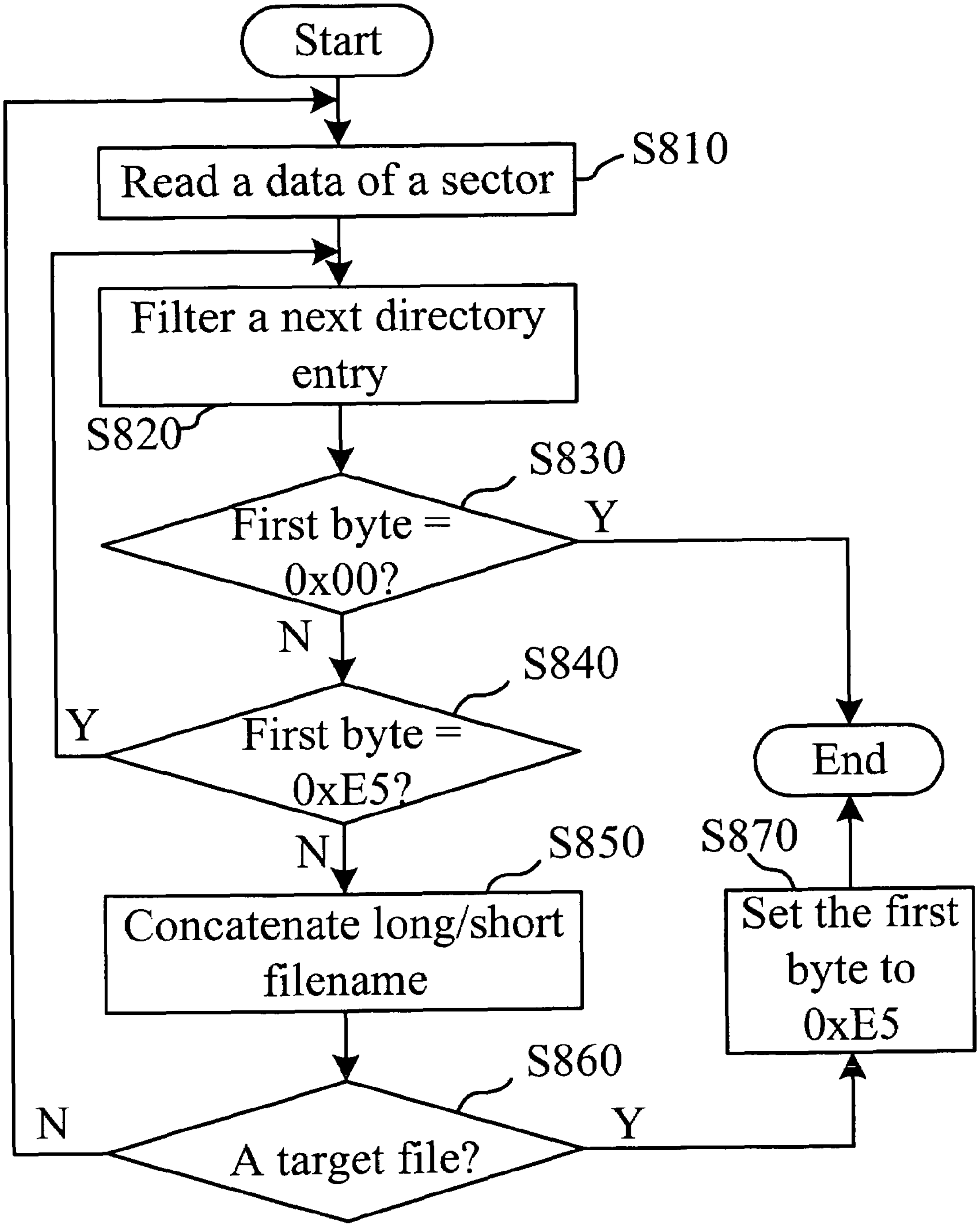
FIG. 9 is a flowchart of a recycle-free directory entry method for deletion in accordance with the invention.

FIG. 9 is a flowchart of a delete method for the recycle-free directory entry system in accordance with the invention. As shown in FIG. 9, step S810 reads a data of a sector 430 from a storage device 410. Step S820 filters a data of a directory entry 420 from the sector 430, namely, the first 32 bytes of the directory entry 420 are filtered. Step S830 determines if the directory entry 420 is free and not followed by another directory entry 420, i.e., the first byte of the directory entry 420 contains 0x00. When the first byte contains 0x00, deleting a directory entry is not required and the procedure is ended; and conversely, step S840 is executed again.

Step S840 determines if the directory entry 420 is free and followed by another directory entry 420, namely, the first byte of the directory entry 420 contains 0xE5. When the first byte of the directory entry 420 contains 0xE5, step S820 is executed again to filter a next directory entry; and conversely, step S850 is executed.

Step S850 concatenates all data read to form a filename. Step S860 determines if the file corresponding to the sector 420 is a target file to be deleted. When the file corresponding to the sector 420 is the target file to be deleted, step 870 is executed; and conversely, step S810 is executed again to read a data of a next sector. In step S850, the first byte of the sector 430 is set to 0xE5 to indicate that the file corresponding to the sector 430 is deleted.

The recycle-free directory entry system fixedly uses a sector to record all directory entries of a file. FIG. 10 is a schematic view of using a sector to record all directory entries corresponding to a file. As shown in FIG. 10, the file has three directory entries 910, 920, 930. The first byte 911 of the directory entry 910 contains 0x43, which has a lowest nibble of three to indicate that the file has three directory entries. In order to be compatible with a FAT32 file system of a current operating system, the invention which uses a sector to record all directory entries of a unique file, and other directory entries 940, 950 after the directory entry 930 in a same sector are filled in the respective first bytes 941, 951 with 0xE5 in hex. Thus, the file becomes a deleted file, and the directory entries 940, 950 become the directory entries of the deleted file.

For deleting a file of the file system, the recycle-free directory entry system first traverses a sector corresponding to a directory entry, and then fills in the first bytes of all directory entries of the sector with 0xE5. Thus, the file becomes a deleted file, and the directory entries become the directory entries of the deleted file.

For adding a new file in the file system, the recycle-free directory entry system first traverses an appropriate parent directory, and then finds a first idle sector of the parent directory to fill in the idle sector with all directory entries of the new file. The idle sector can be found easily by determining the first byte of the idle sector to contain a hex value of 0xE5.

Table 1 is a comparison of the invention and the prior art. When a file is to be added in a directory, n files are added previously in the directory and m (n>m) files are deleted previously from the directory, the prior art cannot find an appropriate address for adding the file until the (n+1)-th directory entry is traversed. In this case, upon mathematical induction, adding the file to be the (n+1)-th file has to take the time $n^2$, namely, such an algorithm has the time complexity of $\theta(n^2)$. However, the invention requires only finding an idle sector from the directory to thereby insert all directories or a file to be added. Accordingly, such an algorithm only requires the time complexity of O(n).

TABLE 1

| | Invention | Prior Art |
|---|---|---|
| Store | Fixedly use a sector to store information | Store information in uncertain number of directory entries |
| Traverse | Fixedly traverse in a unit of sector | Traverse in a unit of uncertain number of directory entries |
| Delete | Fixedly delete in a unit of sector | Delete in a unit of uncertain number of directory entries |
| New | Traverse a first idle sector of a parent directory, and insert all directory entries of a file into the idle sector | Mostly requires appending after the last directory entry of a current parent directory |

In view of the foregoing, it is known that the invention stores all directory entries of a file in a same sector, which can improve the reduced read/write performance and eliminate the space waste otherwise caused by multiplying adding and deleting files and directories of the typical FAT32 file system in a long-term. In addition, the invention does not change any field and accordingly is compatible with current FAT32 file systems.

Although the present invention has been explained in relation to its preferred embodiment, it is to be understood that many other possible modifications and variations can be made without departing from the spirit and scope of the invention as hereinafter claimed.

What is claimed is:

1. A recycle-free directory entry system, having a storage device for storing a file system consisting of plural directory entries, the storage device having a plurality of sectors, each said sector recording one or more directory entries of a unique file, the one or more directory entries recording a filename and associated data of the file, wherein each said directory entry comprises:

a directory name field, which has a length of eleven bytes, configured for recording the filename of the file stored in the storage device;

a directory attribute field, which has a length of one byte, configured for recording an attribute of the file stored in the storage device;

a reserve field, which has a length of one byte, configured for recording an identity byte to indicate directory entries corresponding to the file are exclusively recorded in a single sector of the storage device;

a file creation date field for recording a creation date of the file stored in the storage device;

a file creation time field for recording a creation time of the file stored in the storage device; and a file creation date field for recording a millisecond creation time of the file stored in the storage device.

2. The recycle-free directory entry system as claimed in claim 1, wherein each directory entry further comprises:

a file creation date field, which has a length of two bytes, for recording a creation date of the file;

a file creation time field, which has a length of two bytes, for recording a creation time of the file; and a file creation date field, which has a length of one byte, for recording a millisecond creation time of the file.

3. The recycle-free directory entry system as claimed in claim 2, wherein the directory entry further comprises:

a last access date field, which has a length of two bytes, configured for recording a last access date of the file.

4. The recycle-free directory entry system as claimed in claim 3, wherein the directory entry further comprises:

a file write-in date field, which has a length of two bytes, configured for recording a write-in date of the file; and a file write-in time field, which has a length of two bytes, configured for recording a write-in time of the file.

5. The recycle-free directory entry system as claimed in claim 4, wherein the directory entry further comprises:

a file cluster field, which has a length of four bytes, configured for recording a first cluster number of the directory entry.

6. The recycle-free directory entry system as claimed in claim 5, wherein the directory entry further comprises:

a file size field, which has a length of four bytes, configured for recording a size of the file.

7. The recycle-free directory entry system as claimed in claim 6, wherein the file size field records the size of the file in a unit of byte.

8. The system as claimed in claim 1, wherein the storage device is a NOR flash memory, a NAND flash memory or a hard disk.

9. A recycle-free directory entry method, which is used in a file system having a storage device with a plurality of sectors, each said sector recording one or more directory entries of a unique file, the one or more directory entries recording a filename and associated data of the file, each said directory entry including a directory name field having a length of eleven bytes configured for recording the filename of the file, a directory attribute field having a length of one byte configured for recording an attribute of the file, a reserve field having a length one byte configure for recording an identity byte to indicate directory entries corresponding to the file are exclusively recorded in a single sector, a file creation date field for recording a creation date of the file, a file creation time field for recording a creation time of the file, and a file creation date field for recording a millisecond creation time of the file, the method comprising the steps:

(A) reading data of a sector from the storage device;

(B) filtering a directory entry from the data of the sector; and (C) exclusively writing directory entries corresponding to the file in the sector when the directory entry filtered is free, otherwise, executing step (A).

10. The method as claimed in claim 9, wherein step (C) determines that the directory entry filtered is free when a first byte of the directory entry contains 0x00.

11. A recycle-free directory entry method, which is used in a file system having a storage device with a plurality of sectors, each said sector recording one or more directory entries of a unique file, the one or more directory entries recording a filename and associated data of the file, each said directory entry including a directory name field having a length of eleven bytes configured for recording the filename of the file, a directory attribute field having a length of one byte configured for recording an attribute of the file, a reserve field having a length of one byte configured for recording an identity byte to indicate directory entries corresponding to the file are exclusively recorded in a single sector, a file creation date field for recording, a creation date of the file creation time field for recording a creation time of the file, and a file creation date field for recording, a millisecond creation time of the file, the method comprising the steps:

(A) reading data of a sector from the storage device;

(B) filtering a directory entry from the data of the sector; and (C) gathering the filename from the data read when the directory entry filtered is not free, otherwise executing step (A) when the directory entry filtered is free and followed by another directory entry.

12. The method as claimed in claim 11, wherein step (C) determines that the directory entry filtered is not free when a first byte of the directory entry does not contain 0x00 and 0xE5, and that the directory entry filtered is free and followed by another directory entry when the first byte of the directory entry contains 0xE5.

13. A recycle-free directory entry method, which is used in a file system having a storage device with a plurality of sectors, each said sector recording one or more directory entries of a unique file, the one or more directory entries recording a filename and associated data of the file, each said directory name entry including a directory name field having a length of eleven bytes configured for recording the filename of the file, a directory attribute field having a, length of one byte configured for recording an attribute of the file, a reserve field having a length of one byte configured for recording ma identity byte to indicate directory entries corresponding to the file are exclusively recorded in a single sector a file creation date field for recording a creation date of the file, a file creation time field for recording a creation time of the file, and a file creation date field for recording a millisecond creation time of the file, the method comprising the steps:

(A) reading data of a sector from the storage device;

(B) filtering a directory entry from the data of the sector;

(C) concatenating the filename from the data read when the directory entry filtered is not free, and executing step (B) when the directory entry filtered is free and followed by another directory entry; and (0) setting the directory entry to be free when the filename concatenated is a target file to be deleted, and conversely executing (A).

14. The method as claimed in claim 13, wherein step (C) determines that the directory entry filtered is not free when a first byte of the directory entry does not contain 0x00 and 0xE5, and that the directory entry filtered is free and followed by another directory entry when the first byte of the directory entry contains 0xE5.

15. The method as claimed in claim 13, wherein step (D) sets a first byte of the directory entry to 0xE5 for setting the directory entry to be free.

* * * * *